(12) United States Patent
Peters

(10) Patent No.: US 7,624,579 B2
(45) Date of Patent: Dec. 1, 2009

(54) CONVERGENT DIVERGENT NOZZLE WITH SUPPORTED DIVERGENT SEALS

(75) Inventor: Donald W. Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 654 days.

(21) Appl. No.: 11/355,116

(22) Filed: Feb. 15, 2006

(65) Prior Publication Data

US 2007/0186555 A1    Aug. 16, 2007

(51) Int. Cl.
F02K 1/12    (2006.01)

(52) U.S. Cl. .................................. 60/771; 239/265.41

(58) Field of Classification Search .................. 60/771; 239/265.33, 265.37, 265.39, 265.41
See application file for complete search history.

(56) References Cited

U.S. PATENT DOCUMENTS

| 5,484,105 A | * | 1/1996 | Ausdenmoore et al. | .. 239/127.3 |
| 5,680,755 A | * | 10/1997 | Hauer et al. | ............... 60/266 |

FOREIGN PATENT DOCUMENTS

| EP | 0503963 | 9/1992 |
| EP | 0623742 | 11/1994 |
| EP | 1211406 | 6/2002 |
| EP | 1764498 | 3/2007 |
| EP | 0595753 | 8/2007 |

OTHER PUBLICATIONS

European Search Report, dated Jun. 27, 2007.

* cited by examiner

Primary Examiner—Louis J Casaregola
(74) Attorney, Agent, or Firm—Carlson, Gaskey & Olds, PC

(57) ABSTRACT

A nozzle system includes a multitude of circumferentially distributed divergent seals that circumscribe an engine centerline. Each divergent seal includes an interface between a forward seal bridge bracket and an aft seal bridge bracket with a forward bridge support and an aft bridge support which provides axial and radial support for the divergent seals between adjacent divergent flaps. A divergent-convergent seal joint structure includes a horn and a fork. By having the forward bridge bracket retain the divergent seal in the axial direction, there is no need for axial sliding of the divergent seal relative to the divergent flap. The joint structure provides circumferential support as the axial and radial support are provided by the bridge-bracket interface. The joint interface permits the forward end section of the divergent seal and the forward end section of the divergent flap to include a radiused surface which provides a smooth interior interface between the convergent section and the divergent sections.

9 Claims, 12 Drawing Sheets

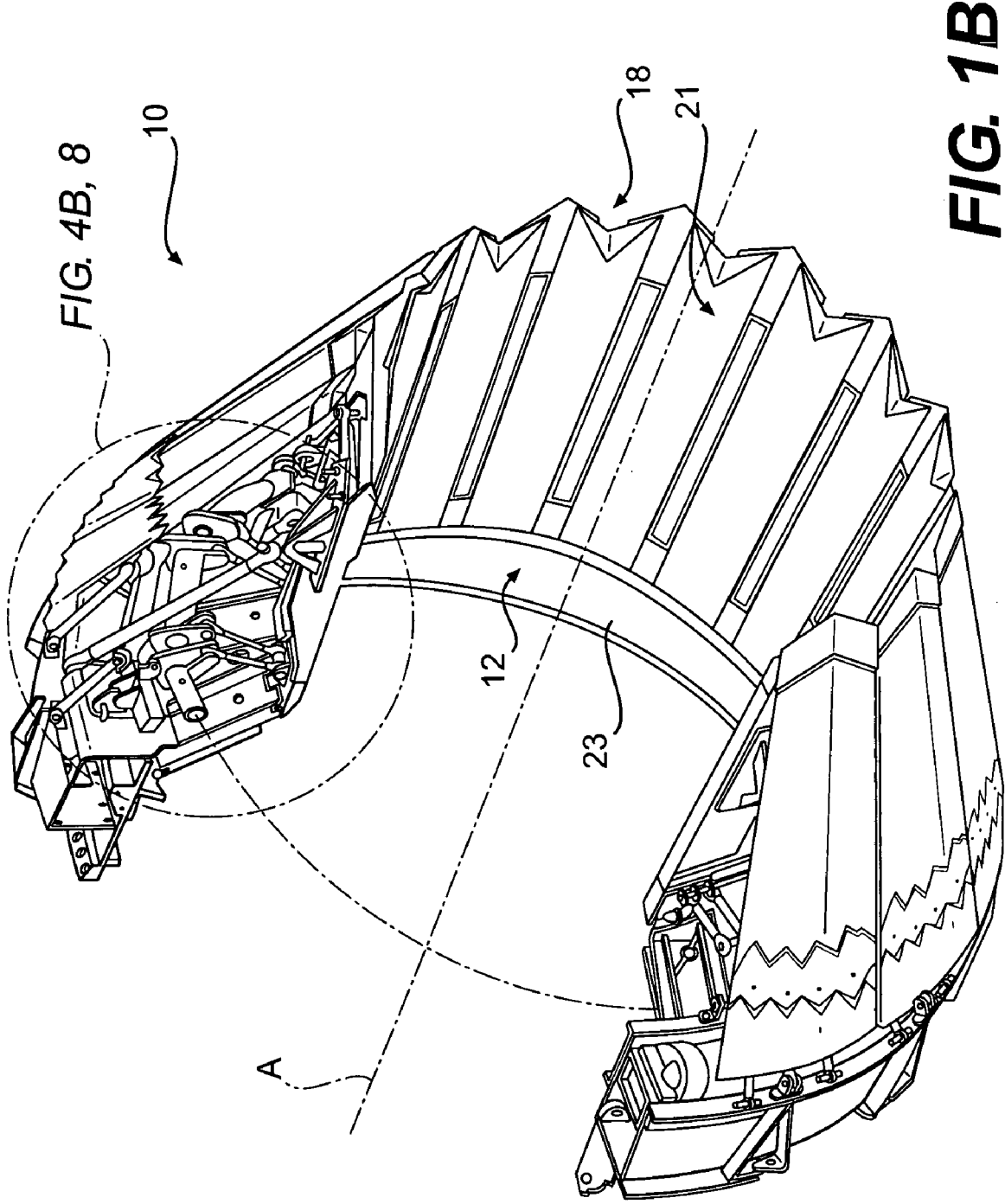

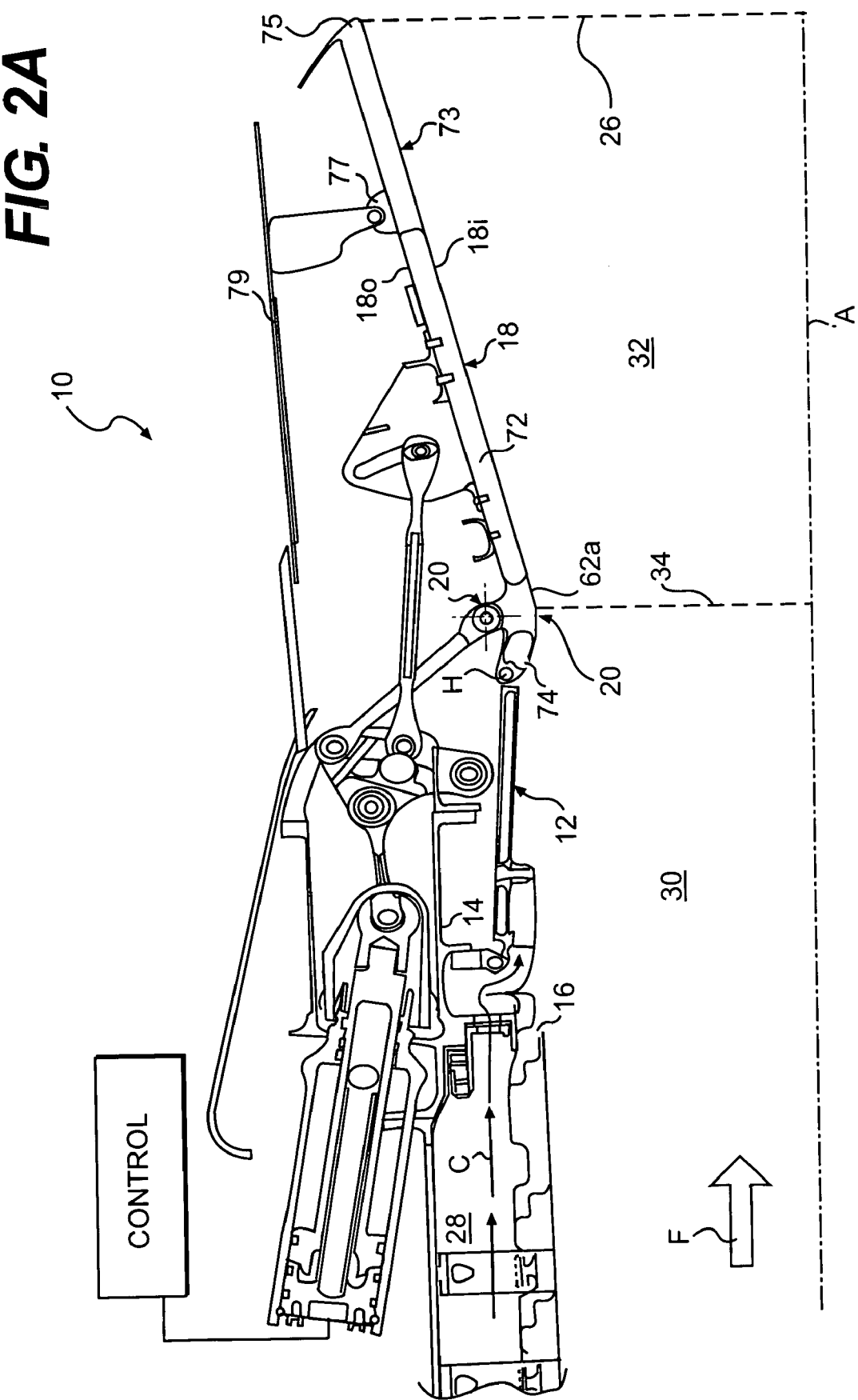

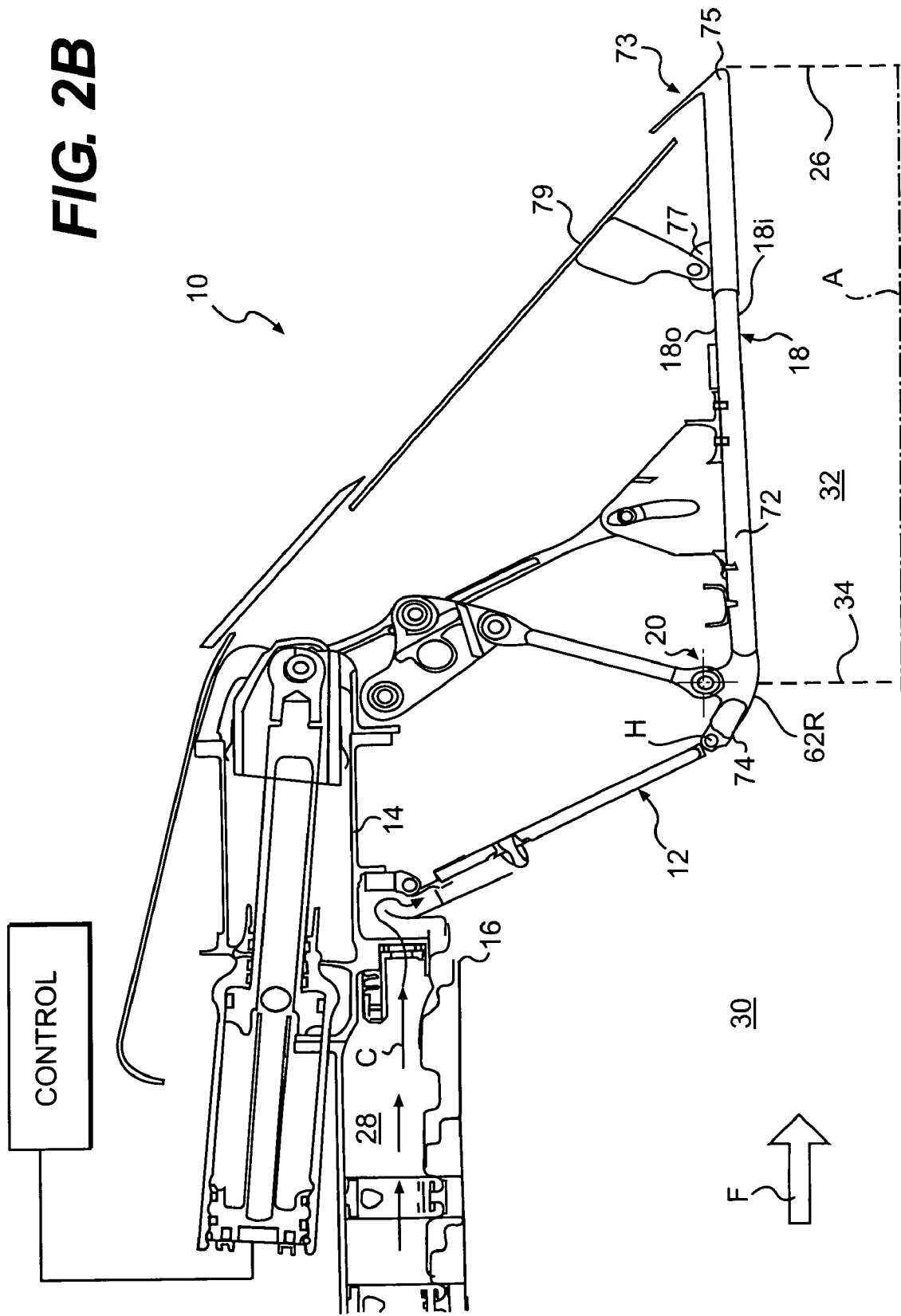

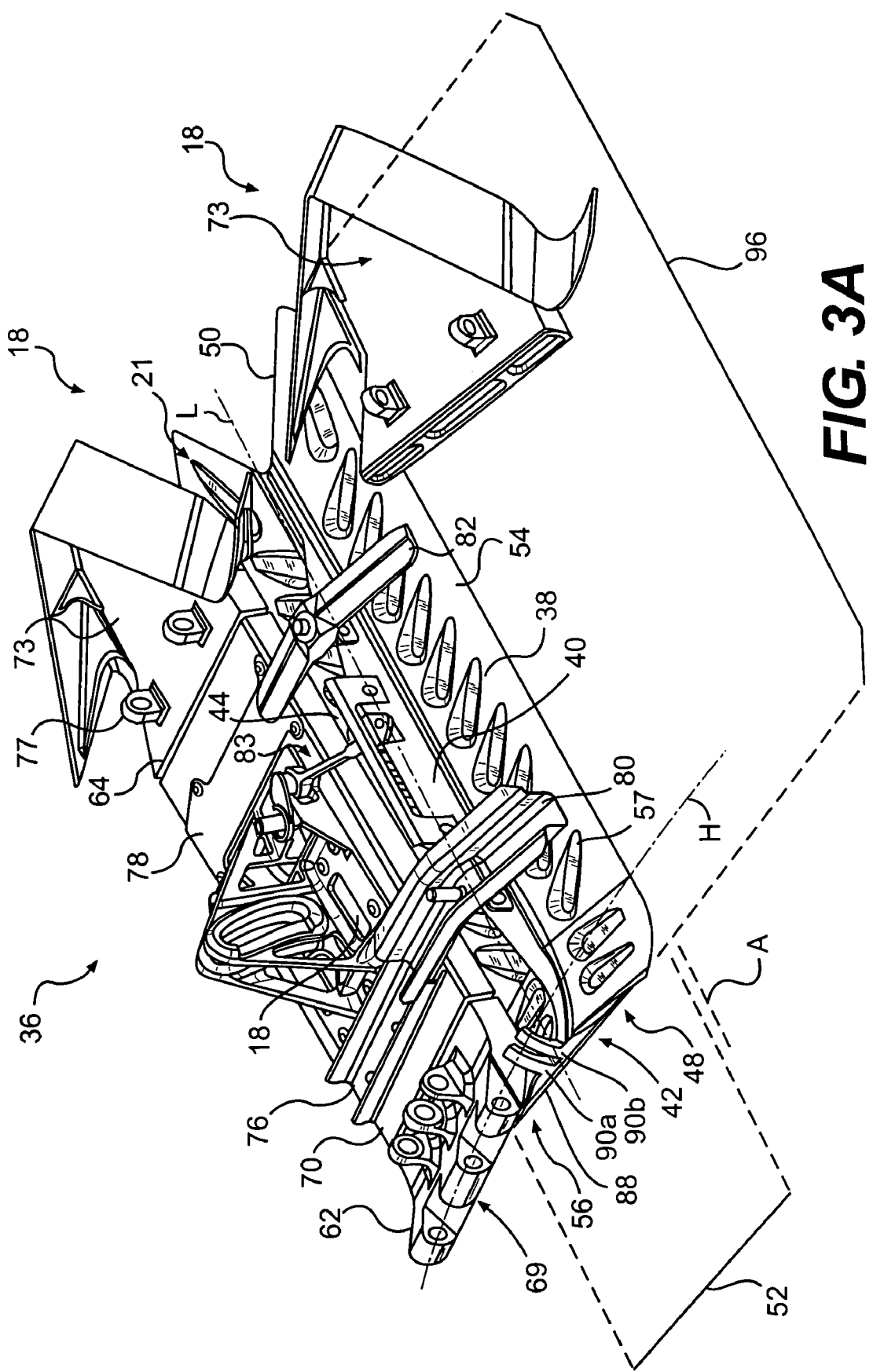

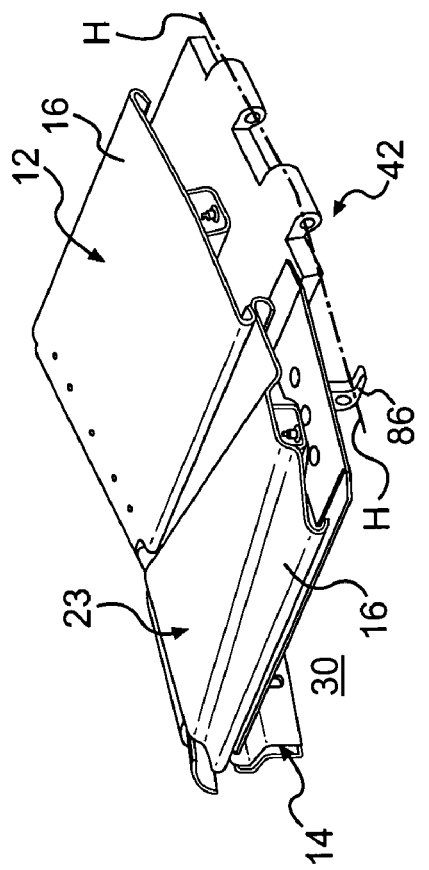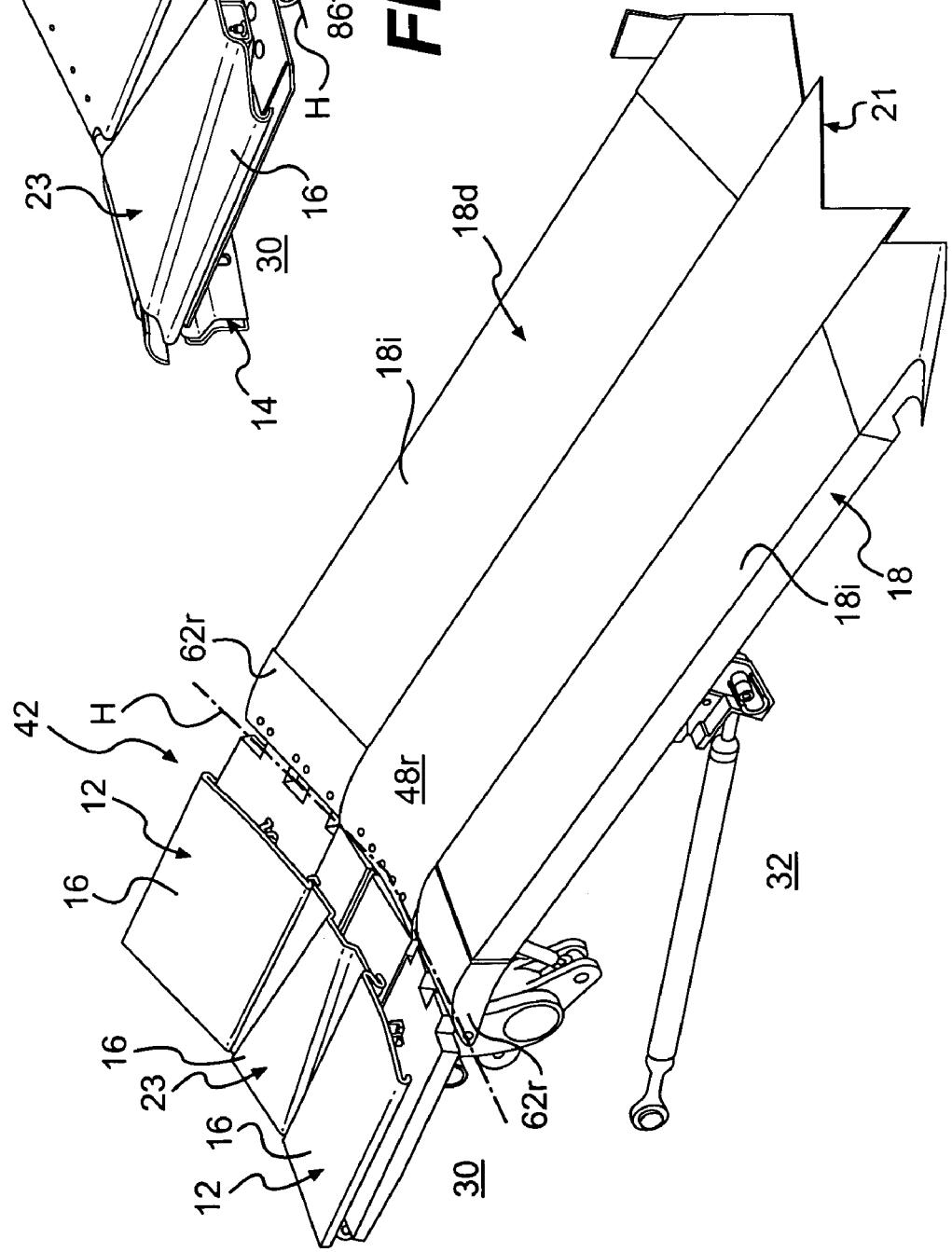

CONVERGENT DIVERGENT NOZZLE WITH SUPPORTED DIVERGENT SEALS

This invention was made with government support under Contract No.: N00019-02-C-3003 with the Department of Navy. The government therefore has certain rights in this invention.

BACKGROUND OF THE INVENTION

The present invention relates to gas turbine engines having convergent/divergent nozzles, and more particularly to divergent seals for such a nozzle system.

A variable area exhaust nozzle optimizes the thrust produced within a gas turbine engine. In augmented gas turbine engines, convergent/divergent (C/D) nozzles provide a multitude of nozzle positions. The term "convergent-divergent" describes an exhaust nozzle having a convergent section upstream of a divergent section. Exhaust gases exiting the turbine(s) pass through the decreasing diameter convergent section before passing through the increasing diameter divergent section.

The convergent section is pivotally connected to the exhaust duct and to the divergent section. The divergent section is pivotally connected to the convergent section and to an external fairing positioned radially outboard of the divergent section. The opposite end of the external fairing is pivotally attached to a static outer case which surrounds a portion of the nozzle.

The variable orifice of the C/D nozzle is typically disposed at an interface between the aft end of the convergent section and the forward end of the divergent section. Orifice area increases and decreases when the aft end of the convergent section is displaced radially outward and inward, respectively.

The nozzle defines a throat or jet area and an exit area. The jet area is the area at which the minimum cross sectional area of the nozzle is defined. The exit area is the aft most section of the nozzle. The area ratio of a nozzle is the exit area divided by the jet area. The area ratio range provides a general indicator of engine performance and an increase in the area ratio range results in more efficient engine performance with increased engine thrust, fuel efficiency and a decrease in actuator loads required to articulate the nozzle.

The convergent and divergent sections generally include flaps and seals circumferentially disposed, attached to one of the other sections or to a structural member within the engine. The alternately disposed flaps and seals accommodate changes in orifice area and nozzle axis skew (if the nozzle is vectorable) by sliding relative to and overlapping each other as the orifice area decreases or increases.

The ability of a C/D orifice nozzle to change orifice area requires considerable flexibility in each section of the nozzle. Flexibility is accommodated by the flaps and seals overlapping one another and sliding relative to one another during nozzle geometry changes. Disadvantageously, the interfaces between flaps and/or between flaps and seals which permit the necessary flexibility may also restrict the area ratio range.

Accordingly, it is desirable to provide a flap and seal arrangement for a C/D exhaust nozzle which accommodates a significant area ratio range.

SUMMARY OF THE INVENTION

The nozzle system according to the present invention includes a plurality of circumferentially distributed convergent flaps, divergent flaps, convergent seals and divergent seals which circumscribe an engine centerline and define the radial outer boundary of a core gas path. The flaps and seals define a convergent section and a divergent section of the nozzle with the throat or jet area defined therebetween. Each convergent seal is pivotably connected to the stationary frame with each divergent seal pivotably connected at a joint at an aft end section of the convergent seal.

Each divergent seal includes a body, a spine member along a seal longitudinal axis, a joint structure and a flap position guide. The joint structure forms a portion of the joint which defines a hinge axis that surrounds the engine centerline. Each divergent flap includes a forward bridge support and an aft bridge support which respectively receive a forward seal bridge bracket and an aft seal bridge bracket mounted to the divergent seal. The forward seal bridge bracket and the aft seal bridge bracket on the divergent seal bridge the forward bridge support and the aft bridge support of the two adjacent divergent flaps to link movement between adjacent divergent flaps and seals around the circumference of the nozzle.

The interface of the forward seal bridge bracket and the aft seal bridge bracket with the forward bridge support and the aft bridge support provides for axial and radial support for the divergent seal between the adjacent divergent flaps. More specifically, the forward seal bridge bracket provides for axial and radial support for the divergent seal between the adjacent divergent flaps while the aft seal bridge bracket need provide only radial support. That is, the axial and radial support are provided by the sliding interface between the forward seal bridge bracket, the aft seal bridge bracket and the respective forward bridge support and aft bridge support rather than at the hinge line.

By having the forward bridge bracket retain the divergent seal in the axial direction, there is no need for axial sliding of the divergent seal relative to the divergent flap. A horn is mounted adjacent an aft end of the convergent seal. A fork is mounted adjacent the forward end section of the divergent seal. The fork includes a spline arranged on either side of the longitudinal axis. The horn extends between the splines and need only provide circumferential support as the axial and radial support are provided by the sliding interface between the forward seal bridge bracket, the aft seal bridge bracket and the respective forward bridge support and aft bridge support. Such an interface permits the forward end section of the divergent seal and the forward end section of the divergent flap to include a radiused surface which provide a smooth interior interface between the convergent section and the divergent section which significantly reduces radar cross section when a radar beam is directed toward the rear of the nozzle system.

The present invention therefore provides a flap and seal arrangement for a C/D exhaust nozzle which accommodates a significant area ratio range.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1B is a general perspective view of a variable geometry exhaust nozzle of the present invention with the nozzle shown in a minimum position;

FIG. 2A is a general sectional side view of a variable geometry exhaust nozzle of the present invention with the nozzle shown in a maximum position which corresponds with FIG. 1A, the nozzle being illustrated on only one side of its centerline;

FIG. 2B is a general sectional side view of a variable geometry exhaust nozzle of the present invention with the nozzle shown in a minimum position which corresponds with FIG. 1B, the nozzle being illustrated on only one side of its centerline;

FIG. 3A is a general perspective view of a divergent section of the variable geometry exhaust nozzle from a cold side with an external flap removed and with the divergent section shown in a maximum position;

FIG. 7A is a general perspective view of a convergent section from a "hot" side; and FIG. 7B is a general perspective view of a convergent section from a hot side at a joint to which the divergent sections attach.

DETAILED DESCRIPTION OF THE PREFERRED EMBODIMENT

Figure 1A:
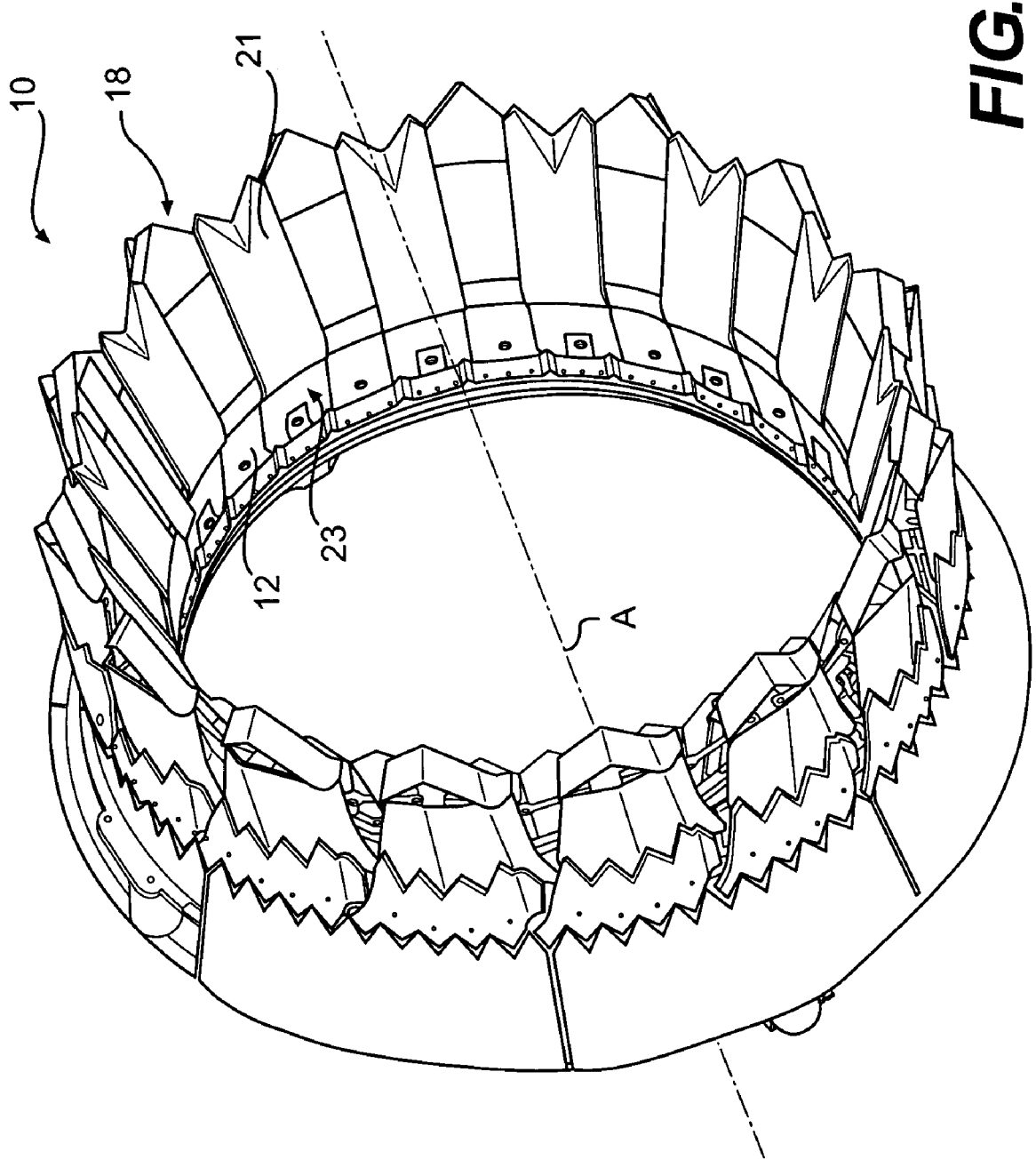
FIG. 1A is a general perspective view of a variable geometry exhaust nozzle of the present invention with the nozzle shown in a maximum position.

FIGS. 1A and 1B illustrate a nozzle system 10 for a gas turbine engine. FIG. 1A depicts the nozzle 10 in a maximum dilated position (also illustrated in FIG. 2A), which is typical during afterburning operation, and FIG. 1B depicts the nozzle system 10 in a minimal dilated position (FIG. 2B), which is typical during non-afterburning operation.

Referring to FIGS. 2A and 2B, the nozzle includes a plurality of circumferentially distributed convergent flaps 12 (only one shown in section), each pivotably connected to a stationary frame 14 with a cooling liner panel 16 upstream thereof. A plurality of circumferentially distributed divergent flaps 18 (only one shown in section) are pivotably connected at a joint structure 20 to an aft end section of the convergent flaps 12.

A plurality of divergent seals 21 (FIGS. 4A and 4B) are each pivotally connected to a respective convergent seal 23 which are respectively distributed circumferentially between each of the divergent flap 18 and convergent flap 12 pairs. Each convergent seal 23 is pivotably connected to the stationary frame 14 with each divergent seal 21 pivotably connected at a joint structure 42 (FIGS. 7A and 7B) adjacent an aft end section of the convergent seal 23.

Taken collectively, the convergent and divergent flaps 12, 18 and the convergent and divergent seals 21, 23 circumscribe the nozzle centerline A to define the radial outer boundary of a combustion gas path F (FIGS. 1A, 1B). During operation, a control system (illustrated schematically) governs the angular orientations of the convergent flaps 12 and divergent flaps 18 to adjust the nozzle throat area 34 and exit area 26 (FIGS. 2A, 2B). Since the Divergent section has a significant radius throat "R" (unlike current art nozzles), the divergent seal 23 preferably does not slide axially relative to the divergent flap 12, as in the current art.

The liner panels 16, taken collectively (also illustrated in FIG. 7A), form a liner that cooperates with the convergent flaps 12 and convergent seals 23 to define an annular cooling airflow passageway 28. The passageway 28 guides a cooling airflow (illustrated schematically by arrows C) along an inner surface of the convergent flaps 12 and convergent seals 21.

The cooling airflow is typically sourced from fan bypass airflow and/or other airflow that is different from the exhaust gas flow (illustrated schematically by arrow F). The cooling airflow C at least partially shields the flaps 12, 18 and seals 21, 33 from the intense heat of the core exhaust gas flow F.

The flaps 12, 18 and seals 21, 23 define a convergent section 30 and a divergent section 32 of the nozzle with the throat 34 or jet area defined therebetween. The throat 34 is the minimum cross sectional area of the nozzle and when compared to the nozzle exit area 26 defines the nozzle area ratio. An increased area ratio range (Exit area/jet area) results in more efficient engine performance with increased engine thrust, fuel efficiency, with a significant decrease in actuator loads required to articulate the nozzle between the open and closed positions.

Figure 3B:
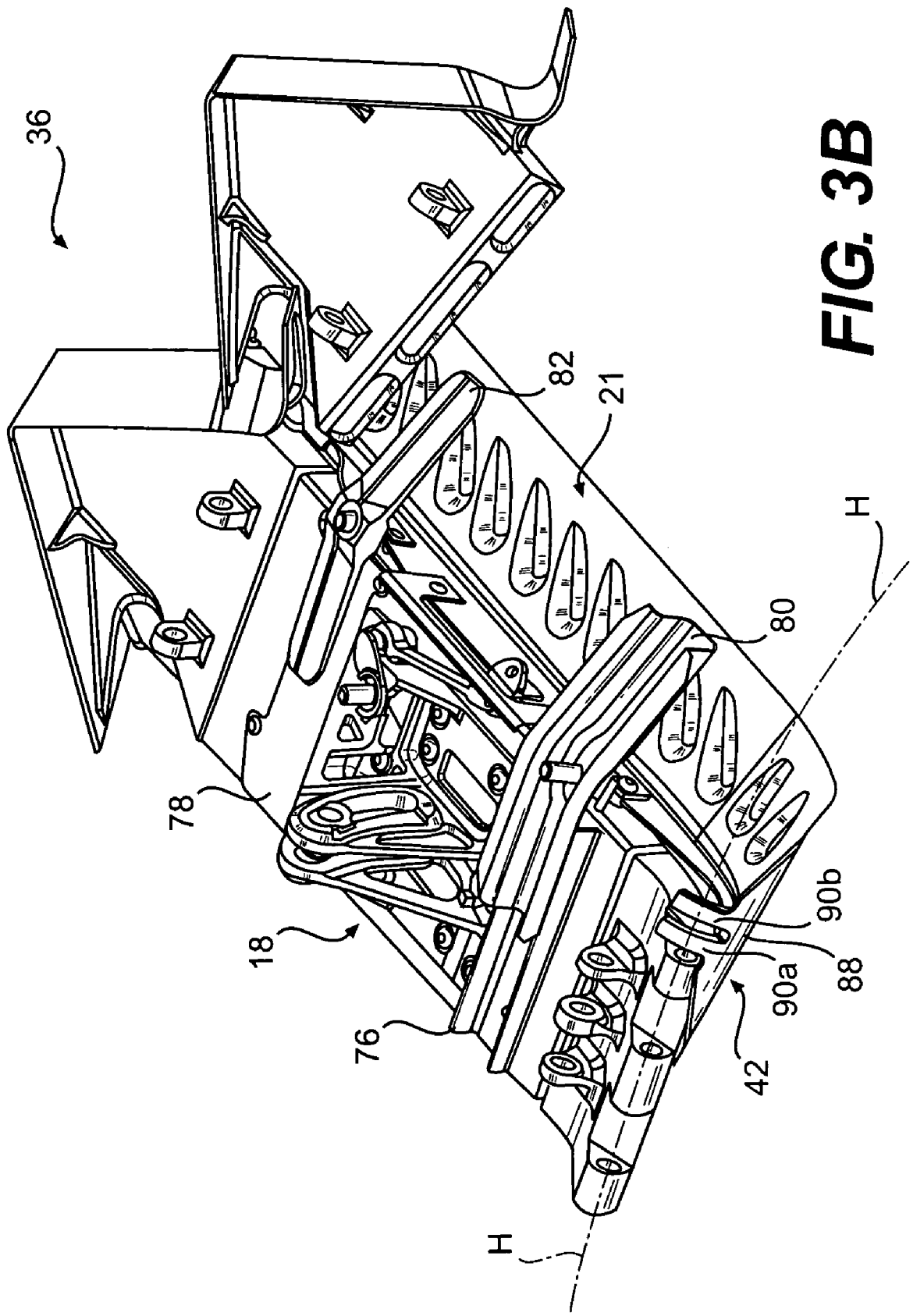
FIG. 3B is a general perspective view of a divergent section of the variable geometry exhaust nozzle from a cold side with an external flap removed and with the divergent section shown in a maximum position.

Referring to FIG. 3A, a divergent flap-seal section 36 includes one divergent seal 21 with one divergent flap 18 (one shown full; one shown partially) mounted along each longitudinal side 54, 56 thereof. It should be understood that the flap-seal section 36 as illustrated herein is for descriptive purposes and that the description applies to each adjacent flap 18 and seal 21 defined about the circumference of the nozzle 10. In FIG. 3A, the flap-seal section 36 is illustrated from a cold-side opposite the "hot-side" (illustrated in FIGS. 7A and 7B) which is directly exposed to exhaust gases exiting the engine. The cold-side of the flap-seal section 36 is defined as the side opposite the exhaust gas flow path.

Each divergent seal 21 generally includes a body 38, a spine member 40 along a seal longitudinal axis L, a joint structure 42 and a flap position guide 44. The joint structure 42 forms a portion of the joint structure 20 that defines a hinge axis H that surrounds the engine centerline A (FIGS. 2A and 2B).

Figure 5:
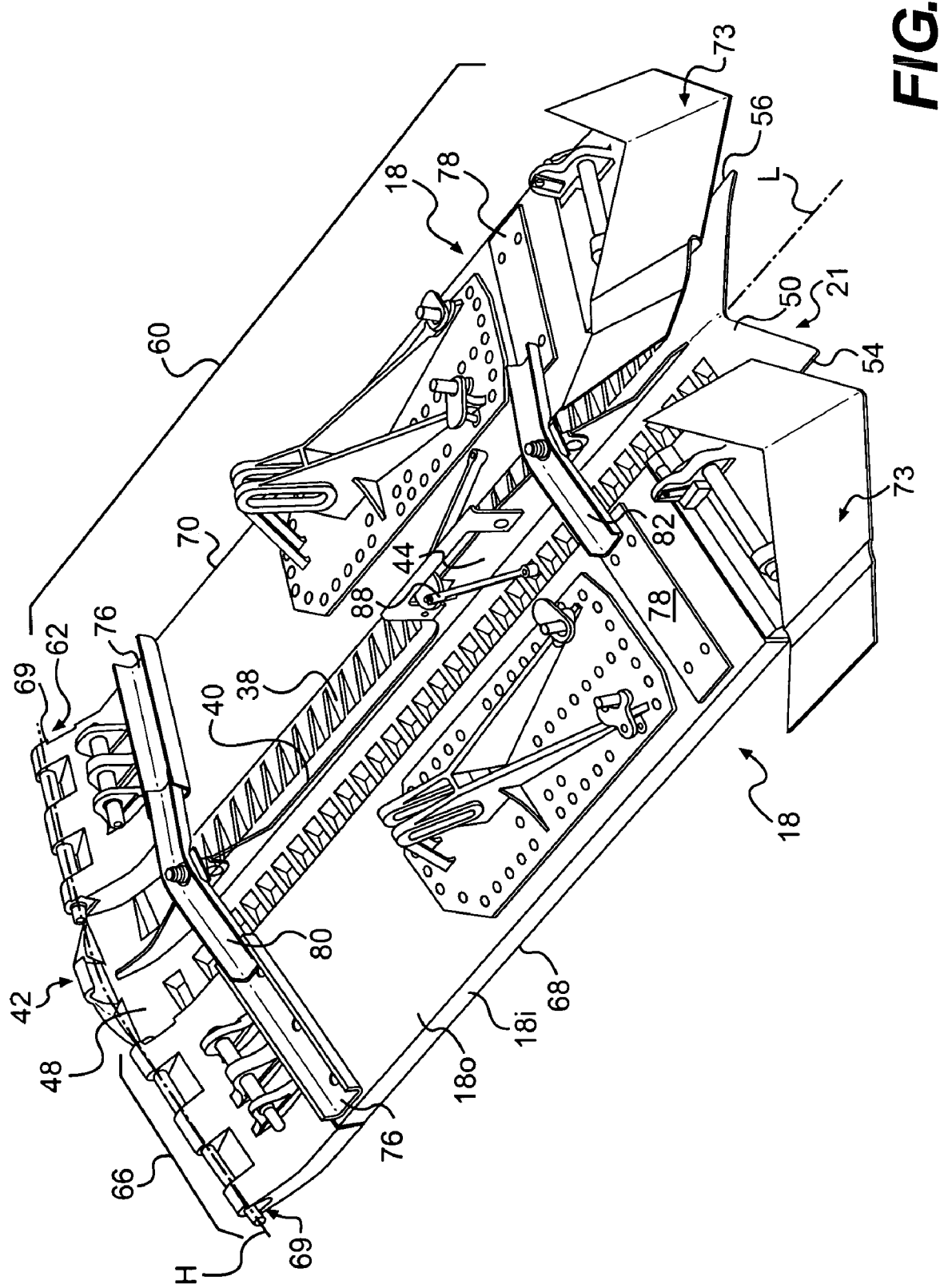
FIG. 5A is a general top perspective external view of a divergent section of the variable geometry exhaust nozzle.

The divergent seal body 38 may be described as having a length 46, defined as extending between a forward end section 48 and an aft end section 50, and a width 52 defined between the first longitudinal side 54 and the second longitudinal side 56 (also illustrated in FIG. 5). The divergent seal body 38 is preferably a relatively planar member having a multitude of structural corrugations 57 or the like. Corrugation geometries other than that illustrated may also be utilized with the present invention. In other words, the seals 21 are preferably solid and not hollow as are the divergent flaps 18. The aft end section 50 is preferably of a chiseled shape to form a serrated nozzle end (FIGS. 1A and 1B).

Figure 6:
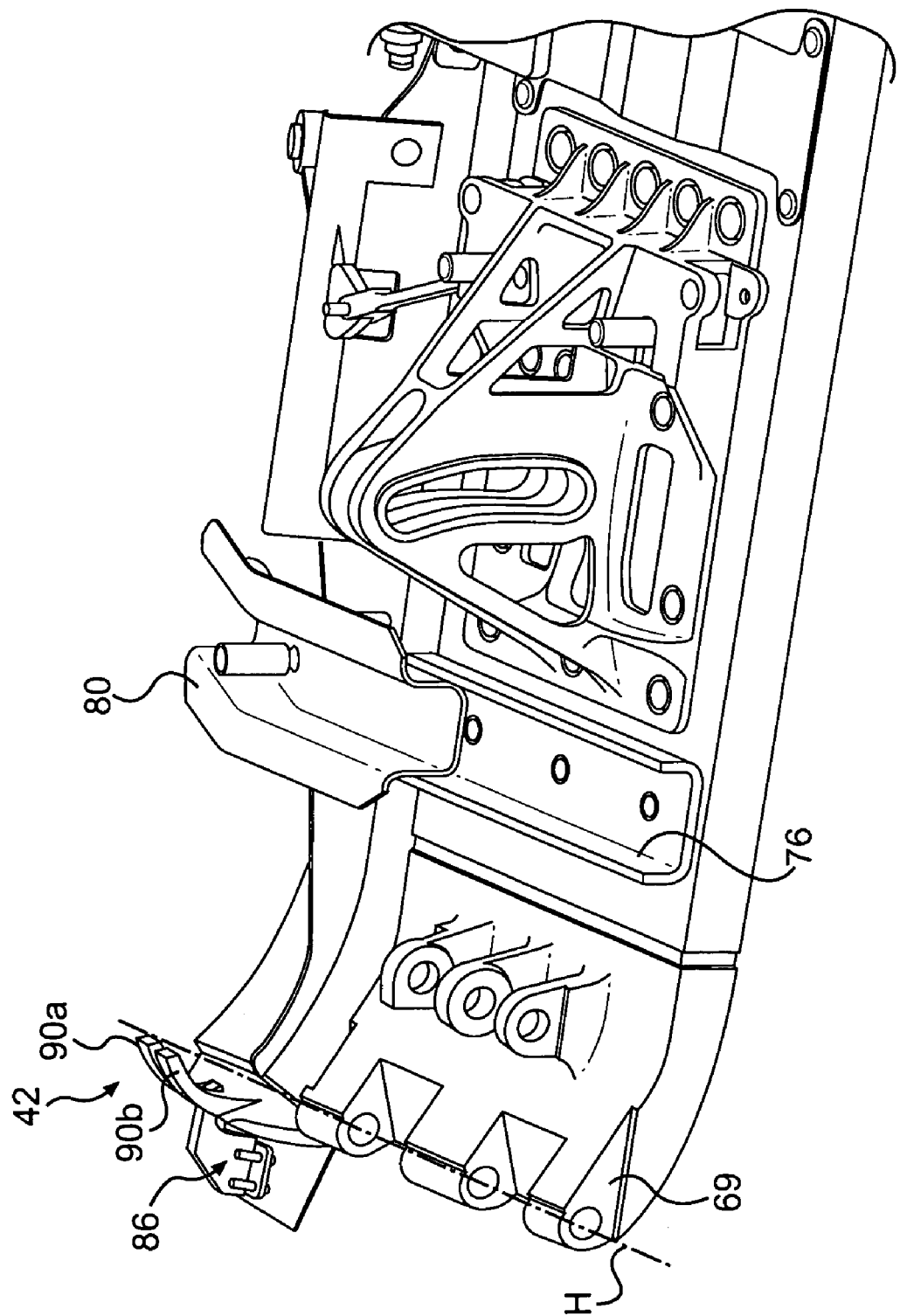
FIG. 6 is a general perspective view of a divergent flap-divergent seal interface according to the present invention from a "cold" side.

Each divergent flap 18 includes an inner skin 18i and an outer skin 18o (also illustrated in FIG. 5). The skins 18i, 18o preferably form a multiple of channels 72 which receive the cooling airflow C therethrough from an intake 74 adjacent to the joint structure 69 (FIGS. 2A and 2B). The divergent flap 18 may be described as having a divergent flap body 60, defined as extending between a forward end section 62 and an aft end section 64, and a width 66 defined between a first longitudinal side 68 and a second longitudinal side 70 (FIG. 6). The forward end section 62 of each divergent flap 18 includes the joint structure 69 that forms a portion of the joint 20 (FIGS. 2A, 2B). The joint structure 69 corresponds with the divergent seal joint structure 42 along the hinge axis H (also illustrated in FIG. 6). The aft end section 64 is preferably of a chiseled shape to form a serrated nozzle end.

Figure 4A:
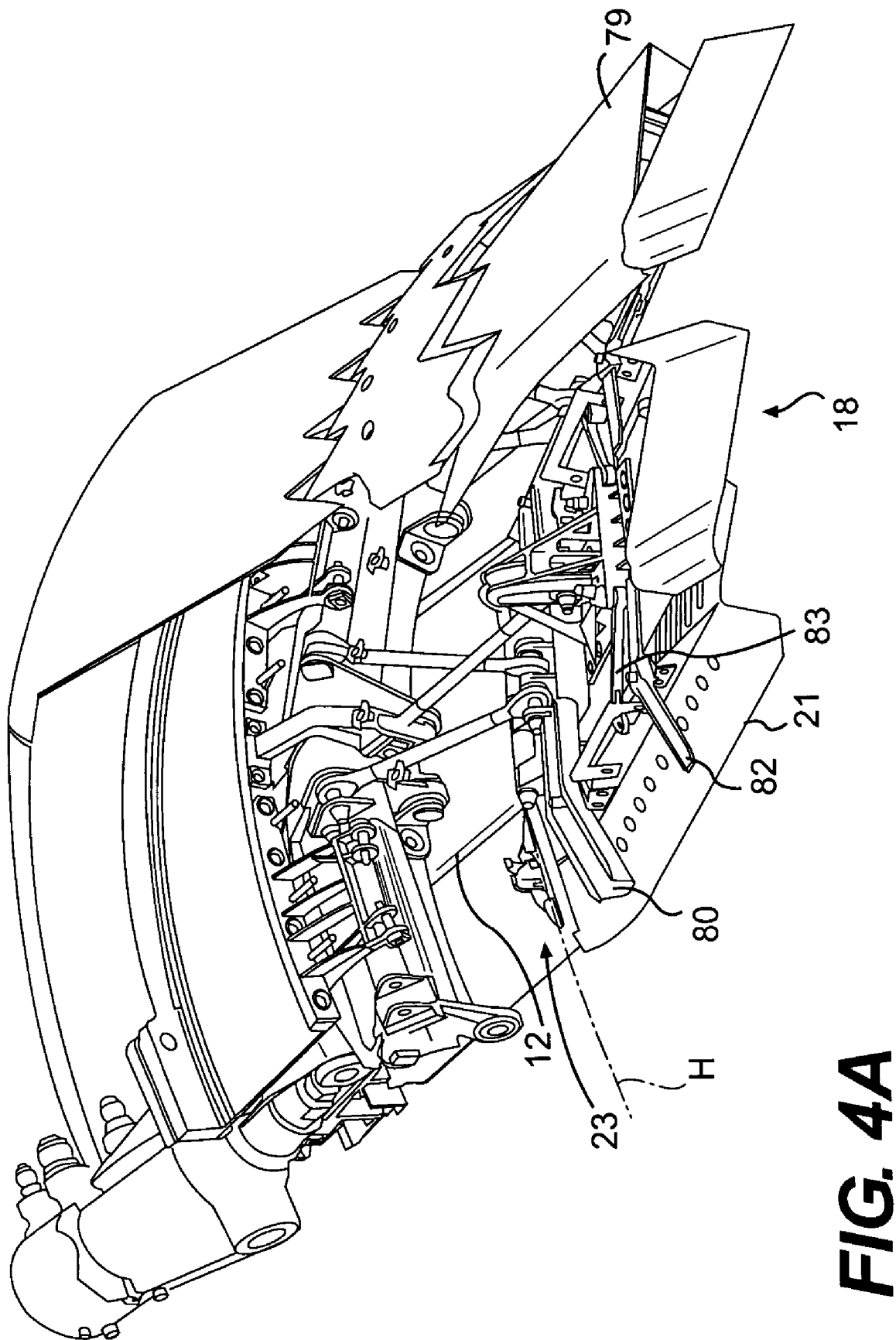
FIG. 4A is a general perspective partial phantom view of a segment of the variable geometry exhaust nozzle of the present invention with the nozzle shown in a maximum position.
Figure 4B:
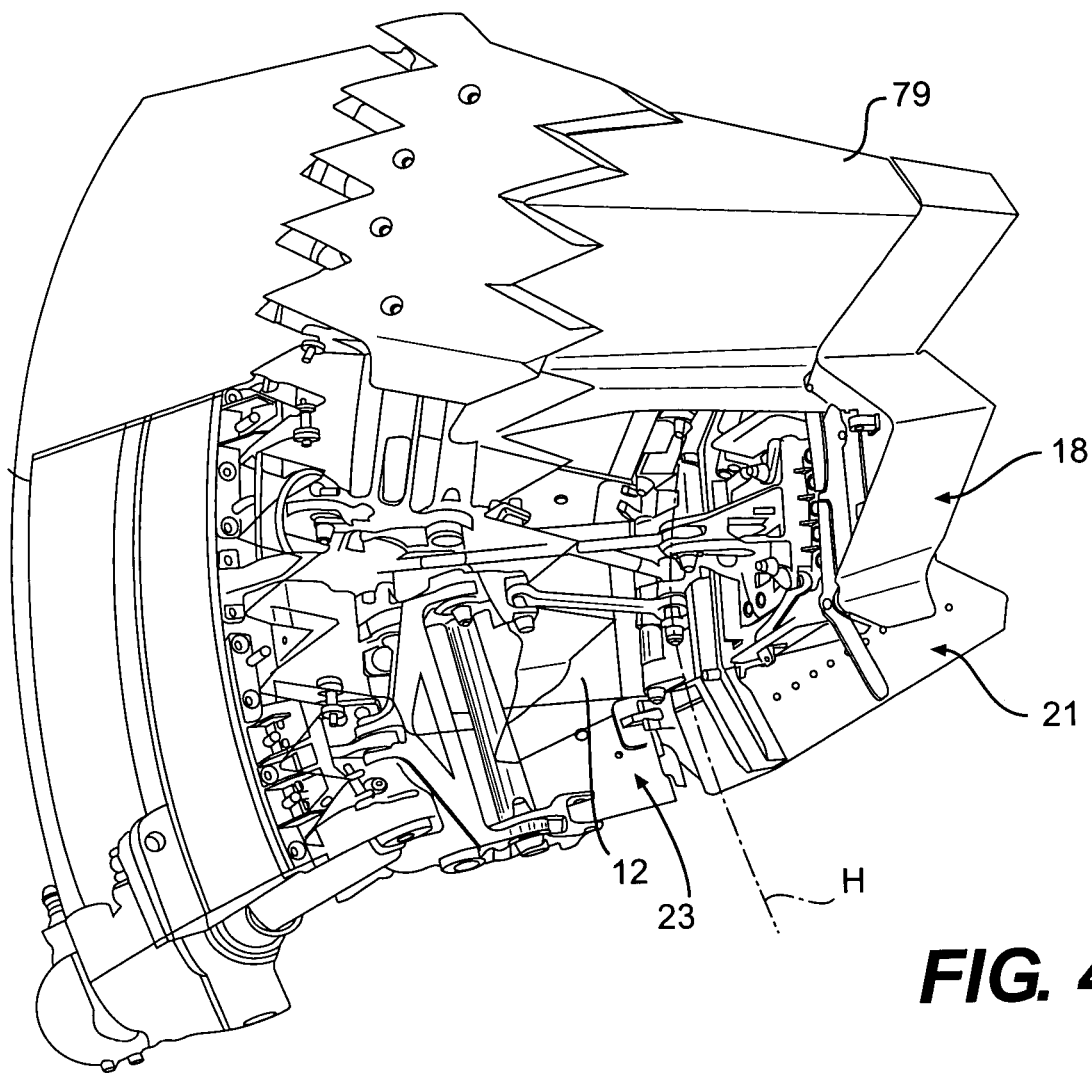
FIG. 4B is a general perspective partial phantom view of a segment of the variable geometry exhaust nozzle of the present invention with the nozzle shown in a minimum position.

The aft end section 64 of each divergent flap 18 includes a plow tip section 73 having a multiple of channels 75 (FIGS. 2A and 2B), which receive the cooling airflow C from corresponding channels 72 defined within the divergent flap 18 to then discharge the cooling airflow from a plow tip aft end segment. It should be understood that separate or integral tip sections of various shapes and configurations will benefit from the present invention. The plow tip section 73 is preferably chiseled and includes a hinge point 77 for attachment of an external flap 79 (FIGS. 4A and 4B). It should be understood that various plow tip sections platforms and profiles will be usable with the present invention.

Each divergent flap 18 preferably includes a forward bridge support 76 and an aft bridge support 78 which respectively receive a forward seal bridge bracket 80 and an aft seal bridge bracket 82 mounted to the divergent seal 21. The forward seal bridge bracket 80 and the aft seal bridge bracket 82 of the divergent seal 21 respectively engage the forward bridge support 76 and the bridge support 78 mounted to the adjacent divergent flaps 18.

The forward seal bridge bracket 80 and the aft seal bridge bracket 82 on the divergent seal 21 bridge the forward bridge support 76 and the bridge support 78 of two adjacent divergent flaps 18 to link movement between adjacent divergent flaps 18 and divergent seals 21 around the circumference of the nozzle 10. The interface of the forward seal bridge bracket 80 and the aft seal bridge bracket 82 with the forward bridge support 76 and the aft bridge support 78 provides for axial and radial support for the divergent seal 21 between the adjacent divergent flaps 18. More specifically, the forward seal bridge bracket 80 provides for axial and radial support for the divergent seal between the adjacent divergent flaps while the aft seal bridge bracket 82 need provide only radial support. That is, the combined axial and radial support are provided by the sliding interface between the forward seal bridge bracket 80, the aft seal bridge bracket 82 and the respective forward bridge support 76 and aft bridge support 78 rather than at the hinge line H.

A centering linkage assembly 83 is restrained by the flap position guide 44 to further guide the dilation of the nozzle 10 during articulation between the maximum dilated position and the minimal dilated position and obtain generally synchronous movement between the divergent flaps 18 and divergent seals 21. It should be understood that various linkages and guides are alternatively or additionally usable with the present invention.

The divergent seals 21 at least partially overlap the inner skin 181 of each adjacent divergent flap 18 (FIG. 7A). Within the interior of the nozzle system 10, the seals 21 form an inner layer within an outer layer defined by the divergent flaps 18 in which a seal 21 overlaps each gap between two adjacent divergent flaps 18 relative the nozzle centerline A (FIG. 7A).

Figure 8:
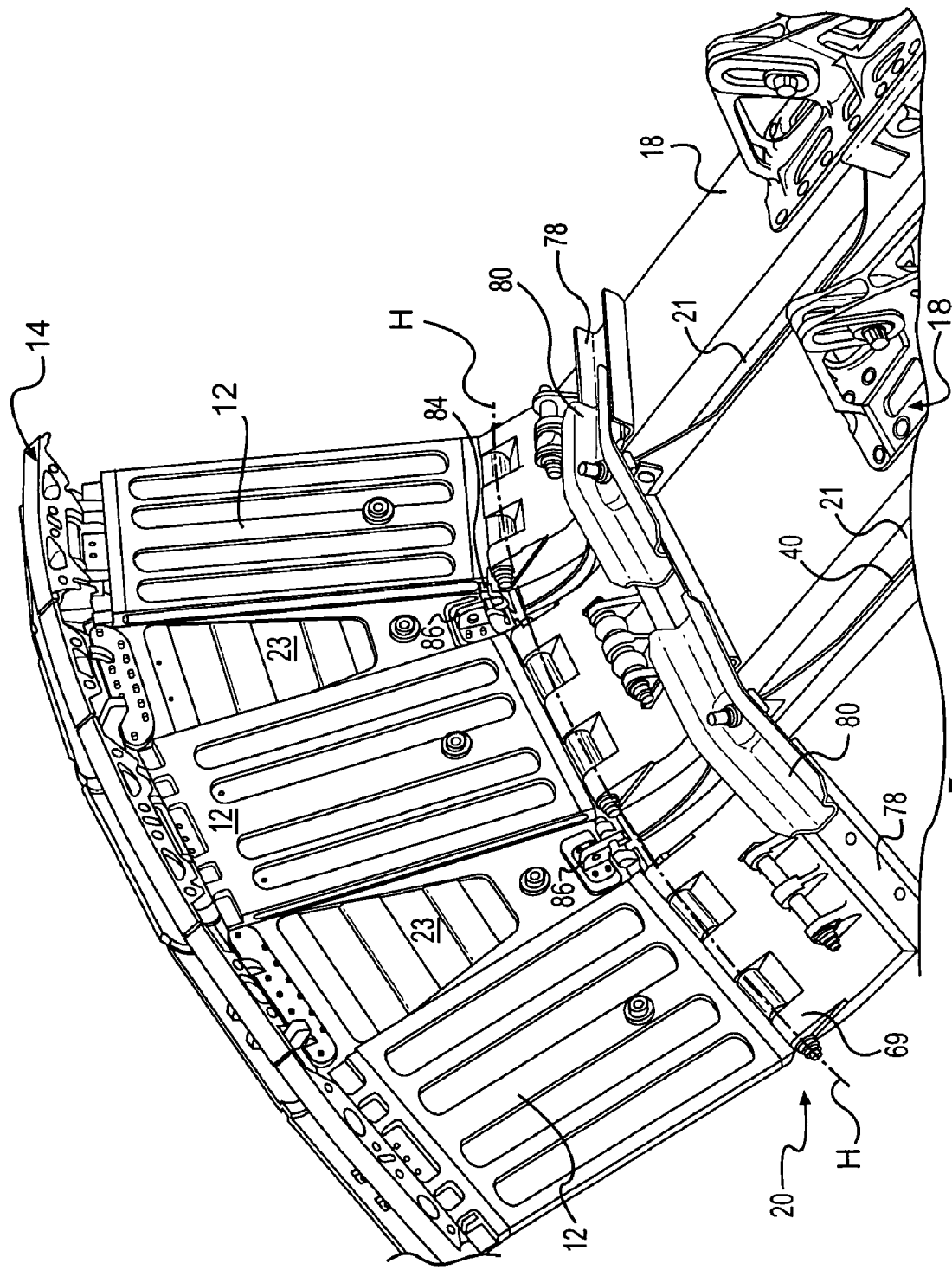
FIG. 8 is perspective view of a convergent divergent section as viewed from a "cold" side.

Referring to FIG. 8, the seal joint structure 42 includes a horn 86 and a fork 88. By having the forward bridge bracket retain the divergent seal in the axial direction, there is no need for axial sliding of the divergent seal 21 relative to the divergent flap 18. The horn 86 is mounted adjacent an aft end of the convergent seal 23 (FIG. 7B). The fork 88 is mounted adjacent the forward end section 48 of the divergent seal 21. The fork 88 includes a spline 90a, 90b arranged on either side of the longitudinal axis L.

The horn 86 extends between the splines 90a, 90b and need only provide circumferential support as the axial and radial support are provided by the sliding interface between the forward seal bridge bracket 80, the aft seal bridge bracket 82 and the respective forward bridge support 76 and aft bridge support 78. More specifically, the forward seal bridge bracket 80 provides for axial and radial support for the divergent seal between the adjacent divergent flaps while the aft seal bridge bracket 82 need provide only radial support. Such an interface permits the forward end section 48 of the divergent seal 21 and the forward end section 62 of the divergent flap 18 to include a radiused surface 48r, 62r (best seen in FIG. 7A) which is radiused relative the relatively planar divergent seal body 38 and the relatively planar divergent flap body 60. The radiused surfaces 48r, 62r of the end sections 48, 62 provide a smooth interior interface between the convergent section 30 and the divergent section 32 (FIG. 7A) which significantly reduced radar cross section when a radar beam is directed toward the rear of the nozzle system 10 (FIGS. 2A and 2B).

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A convergent/divergent nozzle system comprising:
a divergent seal pivotably mounted about a hinge axis which circumscribes a nozzle centerline, said divergent seal defining a divergent seal longitudinal axis;
a forward seal bridge bracket and an aft seal bridge bracket mounted to said divergent seal transverse to said seal longitudinal axis;
a divergent flap pivotably mounted about said hinge axis adjacent said divergent seal, said divergent flap defining a divergent flap longitudinal axis;
a forward bridge support and an aft bridge support mounted to said divergent flap transverse to said divergent flap longitudinal axis, said forward bridge support engageable with said forward seal bridge bracket to radially and axially support said divergent seal and said aft bridge support engageable with said aft seal bridge bracket support to radially support said divergent seal;
a convergent seal pivotally mounted to said divergent seal, said divergent seal circumferentially retained by said convergent seal;
a horn adjacent an end section of said convergent seal; and
a fork mounted to said divergent seal, said fork having a first tine and a second tine, said horn mounted between said first tine and said second tine to circumferentially retain said divergent seal to said convergent seal.

2. The system as recited in claim 1, wherein said forward bridge support is slidably engageable with said forward seal bridge bracket and said aft bridge support slidably engageable with said aft seal bridge bracket.

3. The assembly as recited in claim 1, wherein said convergent seal is pivotally mountable to a stationary structure about a hinge axis which circumscribes a nozzle system centerline.

4. The assembly as recited in claim 1, wherein said divergent seal includes a divergent seal body having a generally planar surface and a forward end section which includes a radiused surface relative to said generally planar surface, said forward end section adjacent said convergent seal.

5. The system as recited in claim 1, wherein said divergent seal at least partially overlaps an inner skin of said divergent flap.

6. The assembly as recited in claim 1, wherein said fork includes a radiused surface.

7. The assembly as recited in claim 1, wherein said divergent seal does not axial slide relative to said divergent flap.

8. The assembly as recited in claim 1, wherein said first tine and said second tine includes a radiused surface.

9. The assembly as recited in claim 1, wherein said first tine and said second tine are not connected at one end section.

* * * * *

UNITED STATES PATENT AND TRADEMARK OFFICE
CERTIFICATE OF CORRECTION

PATENT NO. : 7,624,579 B2  Page 1 of 1
APPLICATION NO. : 11/355116
DATED : December 1, 2009
INVENTOR(S) : Donald W. Peters It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 943 days.

Signed and Sealed this

Twenty-first Day of December, 2010

David J. Kappos
*Director of the United States Patent and Trademark Office*